US009248385B2

(12) United States Patent
Fraim et al.

(10) Patent No.: US 9,248,385 B2
(45) Date of Patent: Feb. 2, 2016

(54) CENTRIFUGE SEPARATOR

(75) Inventors: Michael Fraim, College Station, TX (US); Sanjeev Jakhete, Stuart, FL (US)

(73) Assignee: GLOBAL WATER HOLDINGS, LLC, Wilmington, DE (US)

( * ) Notice: Subject to any disclaimer, the term of this patent is extended or adjusted under 35 U.S.C. 154(b) by 784 days.

(21) Appl. No.: 13/400,801

(22) Filed: Feb. 21, 2012

(65) Prior Publication Data

US 2014/0190906 A1      Jul. 10, 2014

(51) Int. Cl.
| | |
|---|---|
| B04B 5/12 | (2006.01) |
| B01D 17/038 | (2006.01) |
| B01D 19/00 | (2006.01) |
| B01D 21/26 | (2006.01) |
| B01F 13/10 | (2006.01) |
| B01D 17/02 | (2006.01) |

(52) U.S. Cl.
CPC .......... *B01D 21/262* (2013.01); *B01D 17/0217* (2013.01); *B01D 19/0052* (2013.01); *B04B 5/12* (2013.01); *B01D 2247/08* (2013.01); *B01F 13/103* (2013.01)

(58) Field of Classification Search
CPC .............. B04B 1/00; B04B 1/12; B04B 5/12; B04C 3/00; B04C 3/04; B04C 3/06; B04C 9/00; B04C 11/00; B04C 2003/003; B04C 2003/006; B04C 2009/007; B04C 2009/008; B01D 17/0205; B01D 17/0217; B01D 19/0052; B01D 19/0057; B01D 19/0094; B01D 21/26; B01D 21/262; B01D 21/265; B01D 21/267; B01D 45/14; B01D 45/16; B01D 2247/08; B03D 1/1418; B03D 1/1425; B01F 13/103
USPC ....................................... 210/512.3
See application file for complete search history.

(56) References Cited

U.S. PATENT DOCUMENTS

| | | | | |
|---|---|---|---|---|
| 4,478,712 | A * | 10/1984 | Arnaudeau | 210/96.1 |
| 5,470,465 | A * | 11/1995 | Moorehead et al. | 210/205 |
| 5,705,060 | A * | 1/1998 | Robberts | 210/198.1 |
| 6,599,422 | B2 * | 7/2003 | Constantine et al. | 210/512.3 |
| 7,169,305 | B2 * | 1/2007 | Gomez | 210/512.3 |
| 8,328,709 | B2 * | 12/2012 | Bech et al. | 494/49 |
| 2009/0008342 | A1 * | 1/2009 | Nilsen et al. | 210/788 |
| 2012/0111196 | A1 * | 5/2012 | Schook | 95/271 |

* cited by examiner

*Primary Examiner* — David C Mellon
(74) *Attorney, Agent, or Firm* — Daniel S. Polley, P.A.

(57) ABSTRACT

A centrifuge separator for different specific gravity fluid separation. Gas enriched influent is then fed into a rotary impeller, where rotational energy of the impeller is transferred to the incoming fluid creating a forced vortex. Centripetal force exerted on the fluid particles help to separate the fluid/solids to rotate at different radius. Solids are moved towards a periphery of the tube where a cone collector facilitates to collect the solids. The conical shape allows the solids to slide into an annulus. The lighter specific gravity fluids are forced to segregate into two different rotating vortexes by virtue of the rotary motion of the impeller. The gas bubbles mixed with the influent help to accelerate the separation of two different specific gravity fluids.

18 Claims, 8 Drawing Sheets

CROSS SECTION VIEW OF CENTRIFUGE SEPARATOR

CROSS SECTION VIEW
CONICAL CHAMBER

CENTRIFUGE SEPARATOR

FIELD OF THE INVENTION

The present invention relates generally to particle separators and more particularly to a centrifuge separator for different specific gravity fluid separation.

BACKGROUND OF THE INVENTION

It is observed during most current water treatment systems that the suspended solids are the main cause of concern and interfere with performance of the water purification. Also in food and beverage industry the suspended solid particulates are removed by passive filtration, which is very tedious labor oriented.

In the case of an oil spill in the ocean it is necessary to have a high volume flow rate separator machine where the separator machine separates the suspended oil droplets from incoming water. In the pulp and paper industry the wastewater discharged from the plant contains high level of suspended solids, which are presently removed by a coagulation process using chemicals.

The present invention is directed to overcoming the problems currently experienced with separating different particles from each other, and particularly solids and other particles that have become mixed with fluids.

SUMMARY OF THE INVENTION

The present invention generally relates to a centrifuge separator for different specific gravity fluid separation. Influent can be preferably fed into the apparatus through an inlet section of a pipe. Preferably compressed gas can be mixed with the influent and then can be passed into a static mixer. The gas enriched influent can then be fed to the bottom area of a rotary impeller. The impeller can be mounted onto a shaft which can be rotated by a gear box and electric motor or any other rotating mechanism. Rotational energy of the impeller is transferred to the incoming fluid creating a forced vortex. Centripetal force exerted on the fluid particles help to separate the fluid/solids to rotate at different radius from each other. The heavier particles (solids) are moved towards a periphery of the tube. A cone collector nearest to the impeller can be provided to facilitate the collection of the solids. The conical shape allows the solid particles to slide into an annulus. The lighter specific gravity fluids are forced to segregate into two different rotating vortexes by virtue of the rotary motion of the impeller. The gas bubbles mixed with the influent help to accelerate the separation of two different specific gravity fluids. The gas bubbles with the lighter specific gravity fluid can be maintained at the center. The heavier specific gravity fluid can be maintained at the outer radius. A second cone collector is installed at a certain distance from the impeller, which can be provided for collecting the heavier specific gravity fluid. The lighter specific gravity fluid with gas bubbles can be collected at a center tube, which can be preferably in line with the flow.

DETAILED DESCRIPTION OF THE INVENTION

Figure 1:
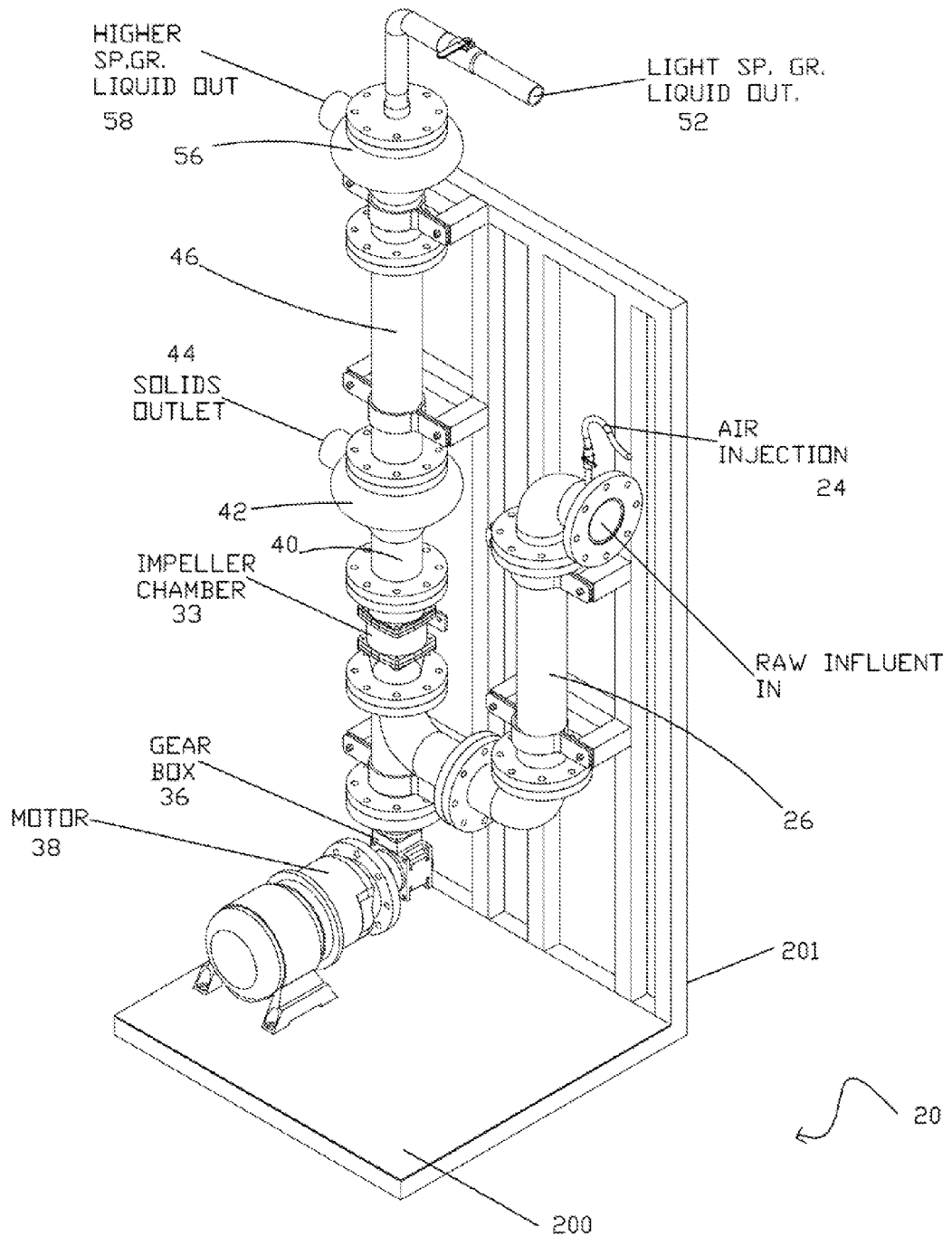
FIG. 1 is a perspective view of a single centrifuge separator in accordance with the present invention.

As seen in the drawings the present invention discloses a centrifuge separator which is generally shown as centrifuge separator 20. Preferably, centrifuge separator 20 can be vertically or substantially vertically oriented. Separator 20 includes a main inlet pipe or influent line 22 which can be preferably in communication with the source of fluid or water to be treated (collectively referred to as "Untreated Fluid"). Untreated Fluid refers to the fact that the various particles contained in the fluid or water have not been separated, and includes fluids that may have already been treated with chemicals or have gone through other purification techniques. Preferably, the Untreated Fluid can consist of fluid(s) and/or solid(s) having different specific gravities that is pumped through a piping system. In one non-limiting embodiment the fluid source is a pipe or piping system which transports the Untreated Fluid and which is in fluid communication with influent line 22. Influent comprising the Untreated Fluid preferably enters into centrifuge separator 20 at influent line in 22 where it can be preferably mixed with compressed air. For this purpose, a gas or air injection line 24 can also be in communication with the internal area of influent line 22 preferably at or near the point of entry of the Untreated Fluid into influent line 22 for injecting gas into the influent. Compressed gas from injection line 24 can be mixed in the stream of the Untreated Fluid at about 0.5 to about 1.0 standard cubic feet per minute ("SCFM") flow rate. Thus, the air can be preferably about 0.5 to about 1% of the total volume of flow, though such is not considered limiting and other values within, below or above this preferred range can be used and are considered within the scope of the invention. The compressed gas is preferably injected in the stream of Untreated Fluid flow before passing through the vanes 28 of a static mixer 26.

Static mixer 26 can be provided after the point where the gas is injected into the influent by air injection line 24. Where provided static mixer 26 helps to breakdown the gas bubbles of the injected gas into smaller sizes which helps with mixing the gas bubbles with the effluent. Upon leaving static mixer 26, the Untreated Fluid mixed with smaller sized gas bubbles enters into an inline Rotor assembly 30 preferably with casing. Rotor assembly 30 includes a stator 31, an impeller 32 which is rotated via its connection to a drive shaft 34 which is connected to and operated by a gear box 36 and motor 38.

Impeller 32 can be disposed within a chamber 33 and can be conventional and provides a rotating component that can be made from various materials including, but not limited to, cast, cast iron, iron, steel, bronze, brass, aluminum, plastic, etc. Impeller 32 transfers energy from motor 38 to the Untreated Fluid by accelerating the Untreated Fluid outwards from the center of rotation. Impeller 32 can be provided with an open inlet to accept the incoming Untreated Fluid, vanes to push the Untreated Fluid radially and a bore to accept drive shaft 34.

Thus, after leaving static mixer 26 the Untreated Fluid is then fed to the bottom of separator 20 and ultimately to the back of impeller 32, which exerts the centripetal force on the incoming object (i.e. Untreated Fluid). Drive shaft 34 drives impeller 32 within a preferred conical casing 33. Based on the orientation of impeller 32, impeller 32 draws the Untreated Fluid from the bottom of separator 20 and pushes the influent upward. As the Untreated Fluid passes across the rotating impeller 32, the fluid starts spinning in the tubular section. Rotor assembly 30 exerts centrifugal force on the incoming Untreated Fluid, which makes the Untreated Fluid, including any suspended solids contained therein, spin at a higher "G" force.

As the particles in the Untreated Fluid and the fluid itself starts rotating under the influence of the rotational speed of impeller 32, the different zones of the different specific gravities for the particles and fluid form in the vertical or substantially vertical straight pipe 40. Thus, as the centripetal force is exerted on the suspended particles due to the rotational motion of impeller 32, each suspended particle attains a radius of rotation according to its mass. This phenomenon allows creating a definite pattern of lower and higher specific gravity particles in the spinning Untreated Fluid.

As suspended solids in the Untreated Fluid have a higher specific gravity as compared to the fluid portions of the Untreated Fluid, the suspended solids as they move upward rotate at the outer periphery. This causes the suspended solids to travel/slide up ramp 41 to first conical chamber 42. First conical chamber 42 can have an annulus ring within chamber 42 which can have a preferred radius range from about 1" to about 3", though such is not considered limiting. The tapered surface of ramp 41 helps the heavier particles (i.e. solids) to glide out of the spin zone and aids in faster separation of the solids from the remaining portion of the Untreated Fluid. The chamber 42 has an opening which permits communication between a solids outlet 44 and the internal area of chamber 42. Through the spinning at the outer periphery in view of the higher specific gravity, at least most of the solids are collected into the first conical chamber 42. At a fixed predetermined interval a de-sludge valve or other valve can be opened and the collected solids are removed intermittently through solids outlet 44. Alternatively, fluid communication between outlet 44 and the internal area of chamber 42 can be provided at all times, such that the solids do not have to wait for a valve to be opened before they are removed. Thus, the spinning of the Untreated Fluid in the vertical pipe attains very definitive zones of very light fluid (lower specific gravity fluid) in the center, and higher specific gravity fluid at outer periphery, thus allowing the solids contained in the Untreated Fluid to be removed through outlet 44 located at the outer periphery of chamber 42.

With at least most of the solids from the original Untreated Fluid removed via outlet 44, the remaining lighter (lower specific gravity fluid) portions of the Untreated Fluid, which is (are) at the center of the pipe are collected and pulled upward through a central tube 46 for further processing. The remaining portion of the Untreated Fluid which enters into and travels through central tube 46 is primarily consisting of one or more fluids which fluids can have different specific gravities when compared to each other. The remaining portion continues to spinning from the rotation of impeller 32 while traveling upward through central tube 46 in view of the force of the preferred continuous flow of fluid in the system.

Similar to the higher specific gravity solids spinning on the outer periphery at chamber 42, the higher specific gravity fluid component of the remaining portion of the Untreated Fluid as it moves upward within tube 46 rotate at the outer periphery. Though not considered limiting, tube 46 can be a straight or substantially straight pipe which provides for a straightening of the fluid flow of the remaining portion of the Untreated Fluid. The rotation of the heavy fluid from the remaining portion of the Untreated Fluid at the outer periphery within tube 46 causes this higher specific gravity fluid component to at least substantially bypass opening 48 of take off pipe 50 and rather continue upwards to where the heavy fluid travels/slides up a ramp 54 of a second conical chamber 56. Chamber 56 has an opening to permit communication between the internal area of chamber 56 and a heavy fluid outlet 58. Second conical chamber 56 can have an annulus ring within chamber 56 which can have a preferred radius range from about 3" to about 24", though such is not considered limiting. The chamber 56 opening permits communication between a heavy specific gravity fluid outlet 58 and the internal area of chamber 56. Through the spinning at the outer periphery in view of the higher specific gravity of the heavy fluid as compared to the light fluid of the remaining portion of the Untreated Fluid, at least most of the heavy fluid is collected into the second conical chamber 56. At a fixed predetermined interval a de-sludge valve or other valve can be opened and the collected heavy fluid can be removed intermittently through outlet 58. Alternatively, fluid communication between outlet 58 and the internal area of chamber 56 can be provided at all times, such that the heavy fluid does not have to wait for a valve to be opened before it is removed. Thus, the spinning of the remaining portion of the Untreated Fluid in the central tube 46 attains very definitive zones of very light fluid (lower specific gravity fluid) in the center, and higher specific gravity fluid at outer periphery, thus allowing the heavy fluids contained in the remaining portion of the Untreated Fluid to be removed through outlet 58 located at the outer periphery of chamber 56.

With heavy fluids removed or substantially removed through outlet 58, the remaining lighter fluids and gases are enter tube or pipe 50 through first opening 48 where they are collected and continue to travel through pipe 50 and out of second opening 52. First opening 48 can extend within chamber 56, such as, but not limited to, down to its lower straight portion 53 or can extend further down such that it is within the top portion of tube or pipe 46. The second outer end (associated with second opening 52) can be secured to any desired structure (i.e. pipe, tube, tanks, hoses, containers, etc.). Thus, the fluid exiting pipe 50 through opening 52 is free or substantially free of unwanted solids and heavy fluids (i.e. water, etc.). In one embodiment, the light fluid can be oil, though such is not considered limiting. Thus, the present invention centrifuge separator provides a method for separating oil from water, such as in the case of an oil spill by a tanker out at sea.

The preferred range for the angle of the ramp 41 and ramp 54 can he about 30 degrees to about 80 degrees. The angles for ramp 41 and ramp 54 do not necessarily have to be the same. A preferred distance between first conical chamber 42 and second conical chamber 56 can range from about 24" to about 60".

Thus, when the Untreated Fluid or remaining portion of the Untreated Fluid is spun at a high force, such as, but not limited to at about 7000 g force or above, the heavier particles spin at an outer periphery. The inclined surfaces provided by the ramp portions provide smooth gliding to the annulus of the chamber where the heavier particles are collected. Accordingly, the primary purpose of the ramp portions is to allow the heavier particles to glide upwards on their inclined surface. The annulus portion of the chambers is primarily provided to temporarily hold the solids before discharge through solids outlet 44. Thus, during an automated discharge cycle or manually discharge all of the solids collected in the annulus will be eliminated from the fluid stream within the pipeline through solids outlet 44.

Though it is preferred to have a cycle for the desludging or discharging, it is also within the scope of the invention to provide for the desludging/discharging to be continuously on, particularly where the Untreated Fluid contains a large amount of solids. Desludging/discharging can be determined by the amount of solids in the Untreated Fluid. Where there is less suspended solids, it is preferred to retain the solids in the annulus of the chamber and discharge intermittently to avoid losing less untreated effluent.

It is preferred to have intermittent de-sludging or removal in connection with first chamber 41 for the removal of the solids and to have a continuous discharge in connection with second chamber 56 for the removal of the higher density fluid. However, such is not considered limiting and other cycles and time periods can be used and all are considered within the scope of the invention.

With centrifuge separator 20 the solids portion of the Untreated Fluid with their higher mass is at the periphery of the pipe when the Untreated Fluid is rotated via impeller 32, causing the solids to get collected in first collecting chamber 42 and removed via outlet 44. Collector tube 50 in the middle or substantially in the middle of tube 46 and/or second chamber 56 is installed to collect the lighter specific gravity fluid and gases contained in the remaining portion of the Untreated Fluid after the solids have been removed. Second collector chamber 56 situated on the top of vertical pipe 46 allows the medium specific gravity fluids (i.e. heavy fluids, etc.) to exit the system via outlet 58.

As seen in the Figures, centrifuge separator 20 (single or in multiple form) can be provided on a skid 200 though such is not considered limiting. Skid 200 can include a vertical or substantially vertical oriented frame 201 where portions of separator 20 can be mounted or otherwise secured thereto.

Figure 2:
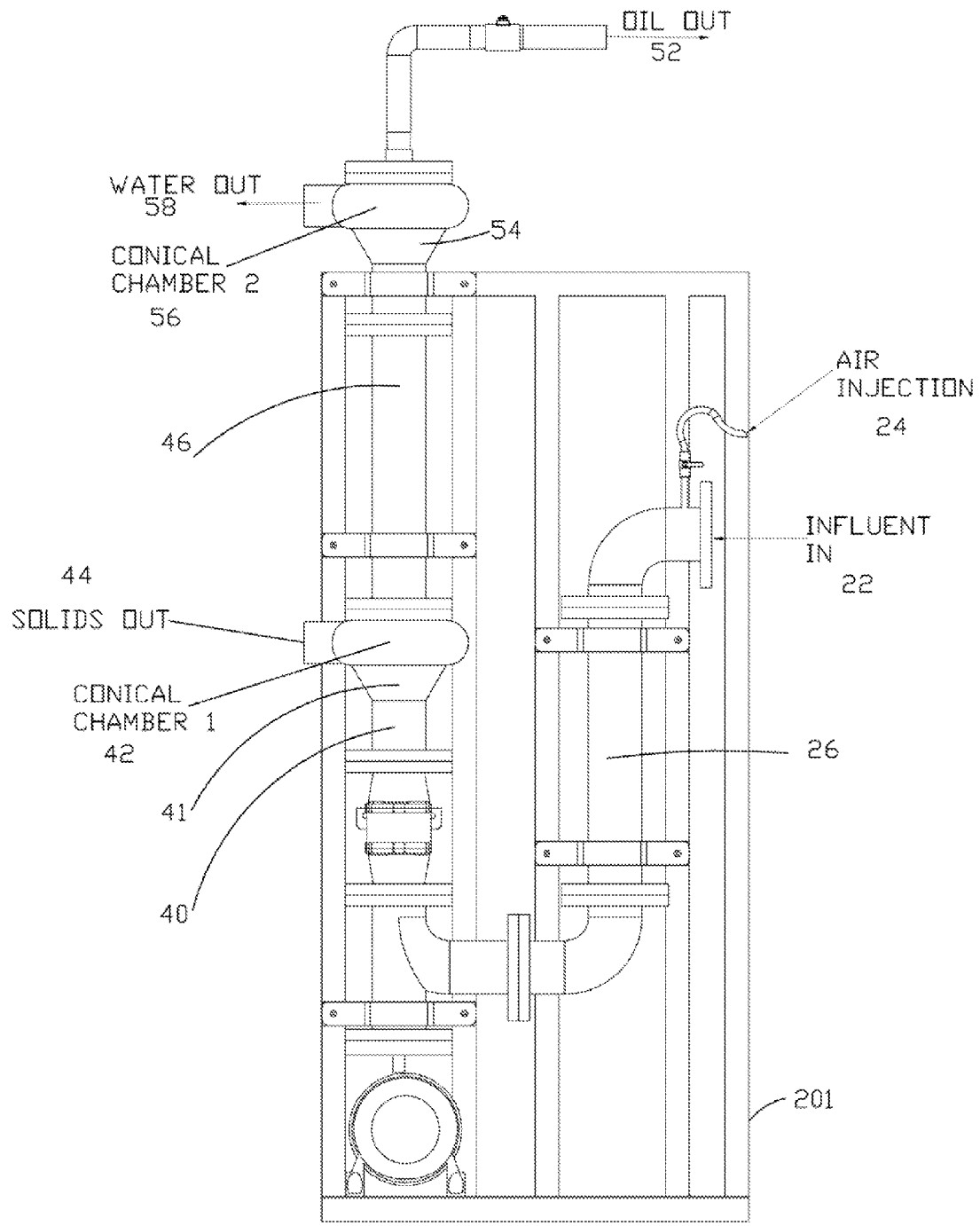
FIG. 2 is a front view of the single centrifuge separator of FIG. 1.
Figure 3:
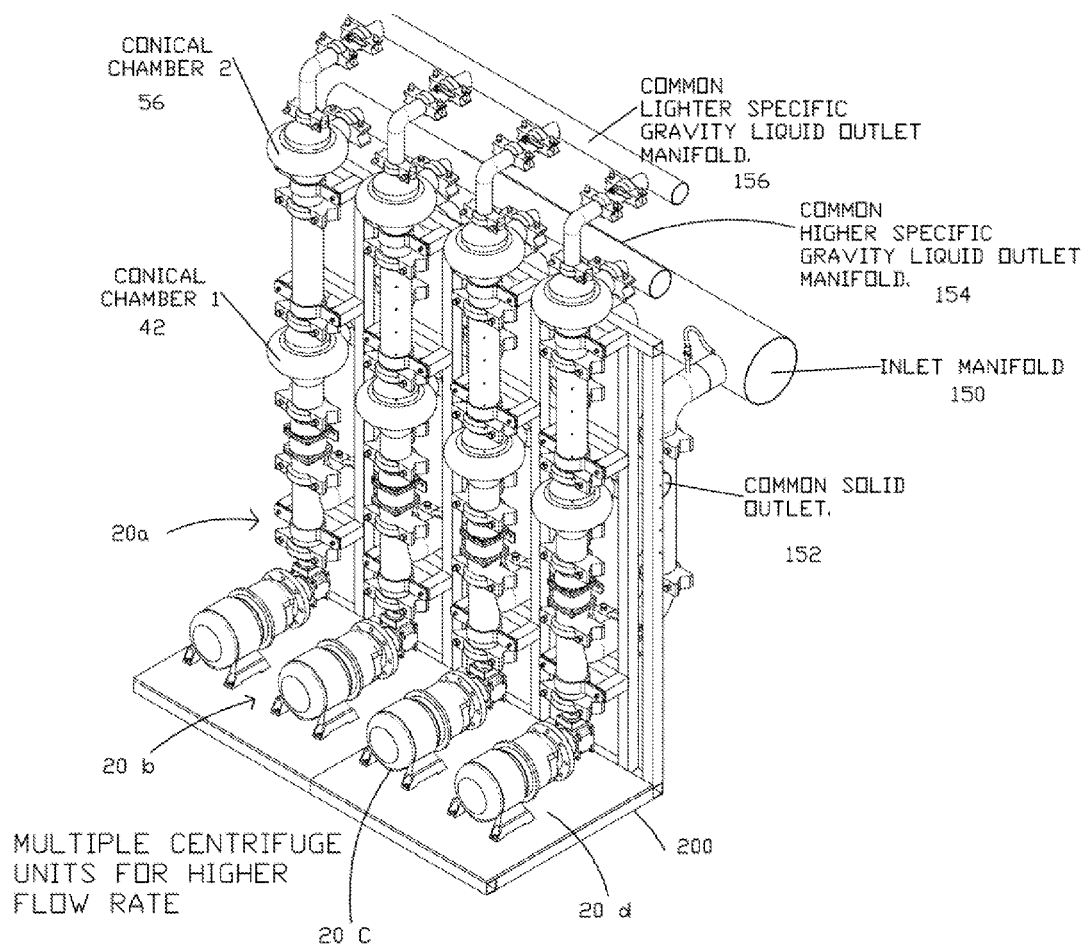
FIG. 3 is a perspective view of a multiple centrifuge separator in accordance with the present invention.
Figure 4:
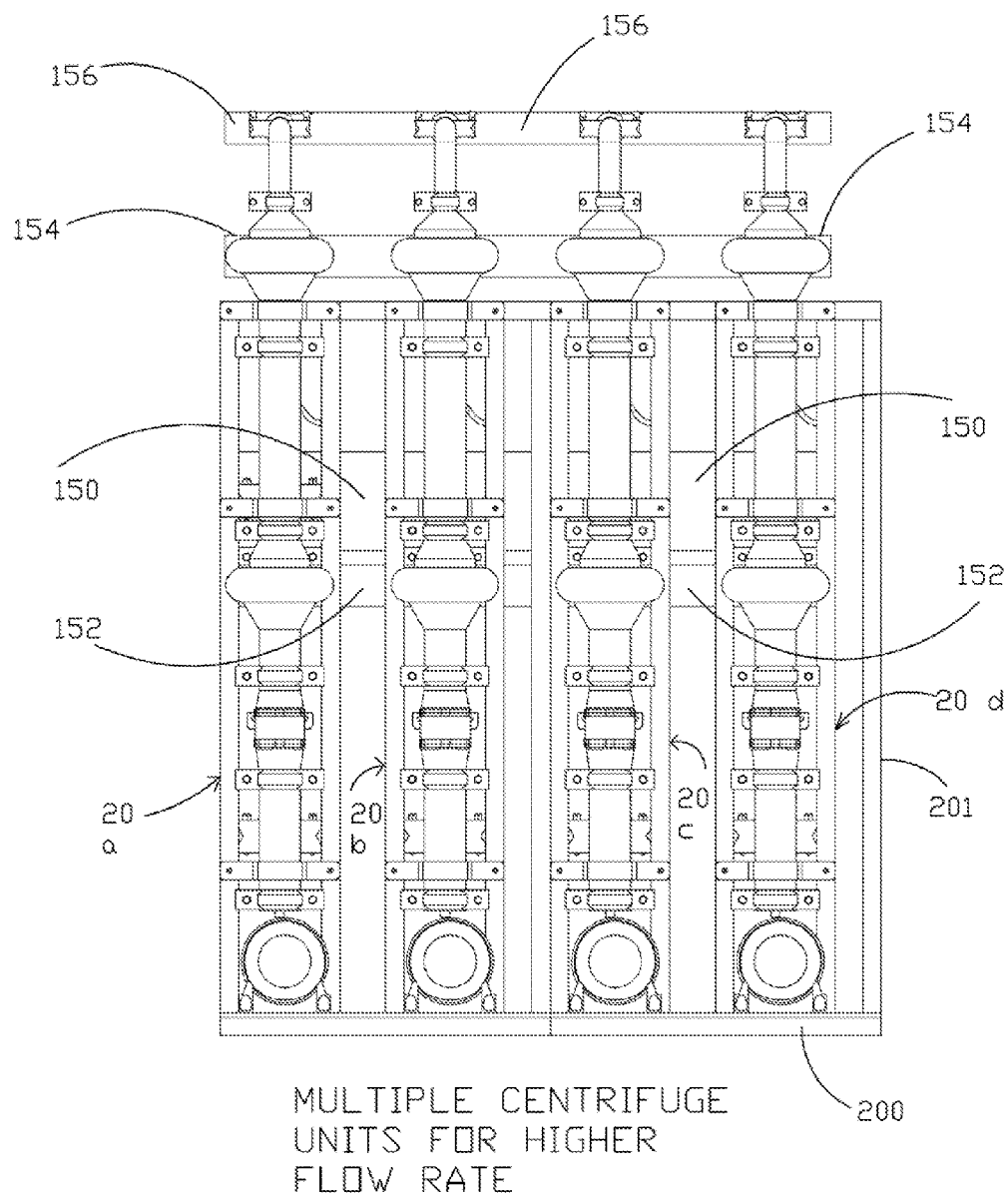
FIG. 4 is a front view of the multiple centrifuge separator of FIG. 1.
Figure 8:
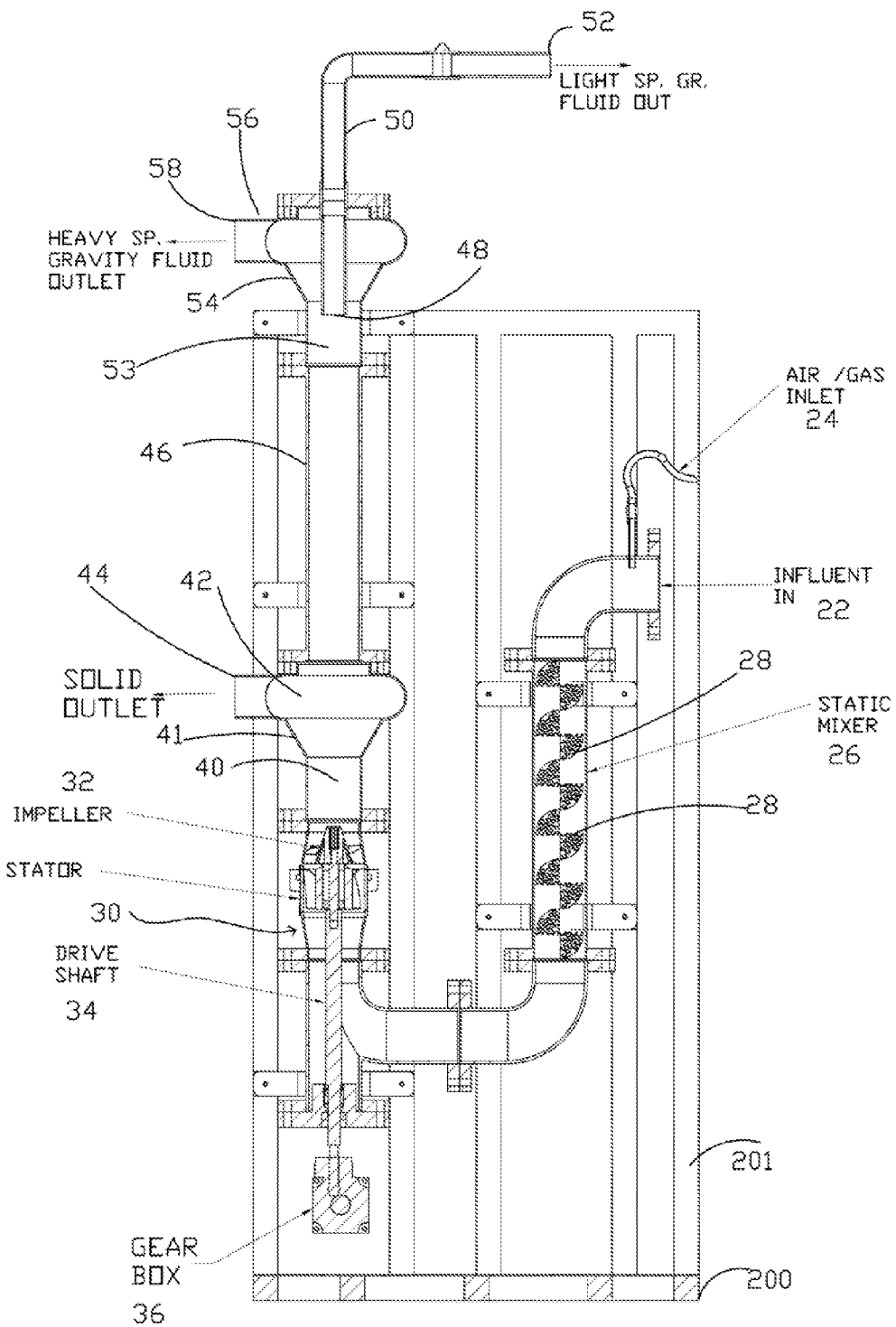
FIG. 8 is a cross sectional view of the single centrifuge separator of FIG. 1.

FIGS. 1, 2 and 8 show single centrifuge separator 20 on skid 200. FIGS. 3 and 4 show an embodiment of the present invention where multiple centrifuge separators 20a, 20b, 20c and 20d are shown coupled together thorough a common manifold for higher flow rate capability. The multiple separators embodiment can also be mounted or secured to a skid and frame. Though FIGS. 3 and 4 show four centrifuge separators, such is not considered limiting, and a greater number or less number of separators 20 can be used in the multiple separator embodiment and all are considered within the scope of the invention.

Each centrifuge separator 20a, 20b, 20c and 20d can be constructed similar and operate similar to centrifuge separator 20 discussed above in connection with the FIGS. 1, 2 and 8 and such discussion for single centrifuge separator 20 is incorporated by reference and considered to apply also to each centrifuge separator of the multiple separator embodiment shown in FIGS. 3 and 4.

Each solid outlet associated with the first chamber of each separator 20a, 20b, 20c and 20d can be in communication with a common solid outlet manifold 152. Similarly each higher specific gravity fluid outlet associated with the second chamber of each separator 20a, 20b, 20c and 20d can be in communication with a common heavy fluid outlet manifold 154. Likewise, each upper collection tube for each separator 20a, 20b, 20c and 20d can be in communication with a common lighter fluid outlet manifold 156. Additionally, an inlet manifold 150 can be in communication with each inlet line for each separator 20a, 20b, 20c and 20d. Inlet manifold 150 brings the Untreated Fluid influent to the multiple separators embodiment, where the influent is then divided between the individual inlet lines for the multiple separators. It should be recognized where the manifolds are provided for the outlets in the multiple separator embodiment, any valves associated with the opening and closing of the outlets may have to be adjusted, moved, reconfigured, etc. to accommodate the addition of the manifolds. In the multiple separator unit there can be provided a common input line for all of the units and an inlet valve for each unit to control the influent (Untreated Fluid) inlet flow into the particular unit of the multiple separator unit. Similarly the solid discharge/outlet, heavy specific gravity fluid discharge/outlet and lighter specific gravity fluid discharge/outlet can be manifold together with isolation valves for each unit.

In all embodiments, a strainer can also be provided within the separator system or prior to entry of the Untreated Fluid through inlet 22. The strainer can remove big size particles before the Untreated Fluid reaches static mixer 26. In one non-limiting embodiment, the strainer size can be up to about 500 micron or above.

For purposes of the definition of Untreated Fluid, the removal of big size particles prior to the effluent reaching the static mixer is not considered to change the effluent from being considered Untreated Fluid. Similarly, the injection of gas or other items through inlet line 24 is also not considered treating the effluent for purposes of the definition of Untreated Fluid. For purposes of the description, the first time the fluid is considered to be treated is when the solids are separated at first chamber 42. A second treatment occurs when the higher specific gravity fluids are removed through second chamber 56.

Figure 5:
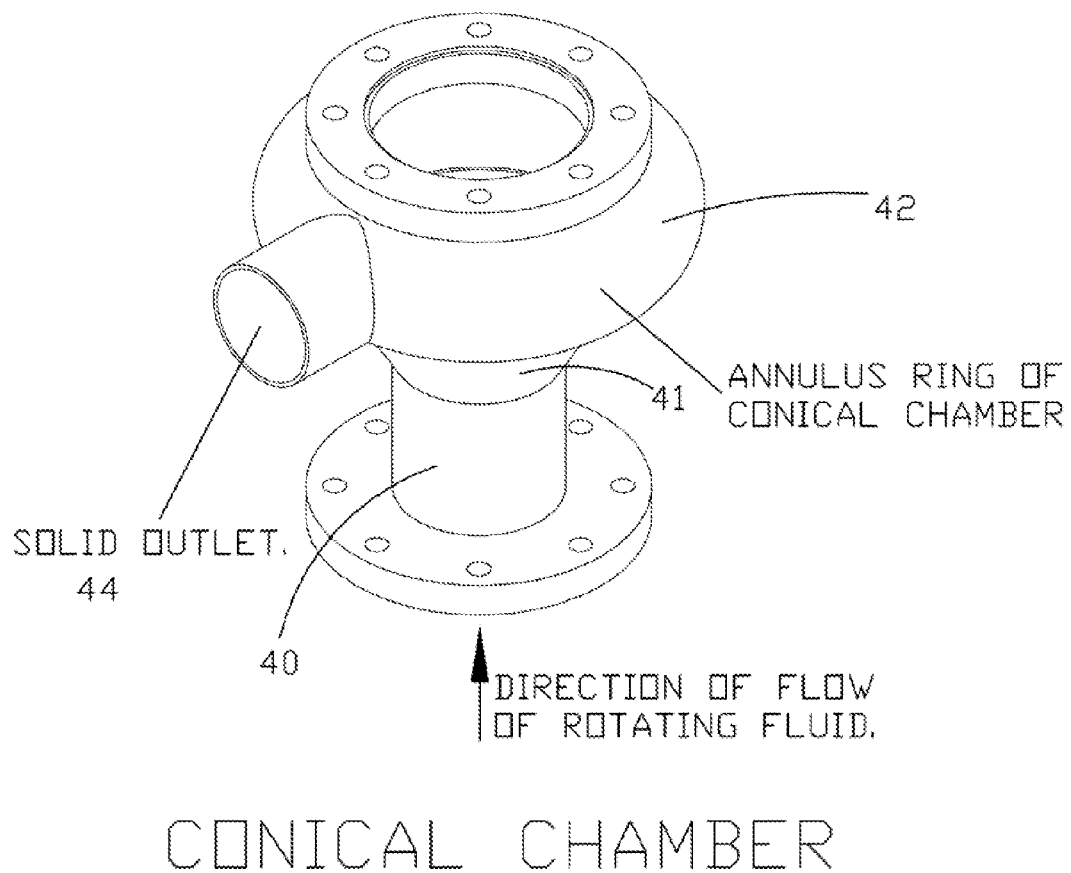
FIG. 5 is a perspective view of a conical chamber for use with the single centrifuge separator or multiple centrifuge separators in accordance with the present invention.
Figure 6:
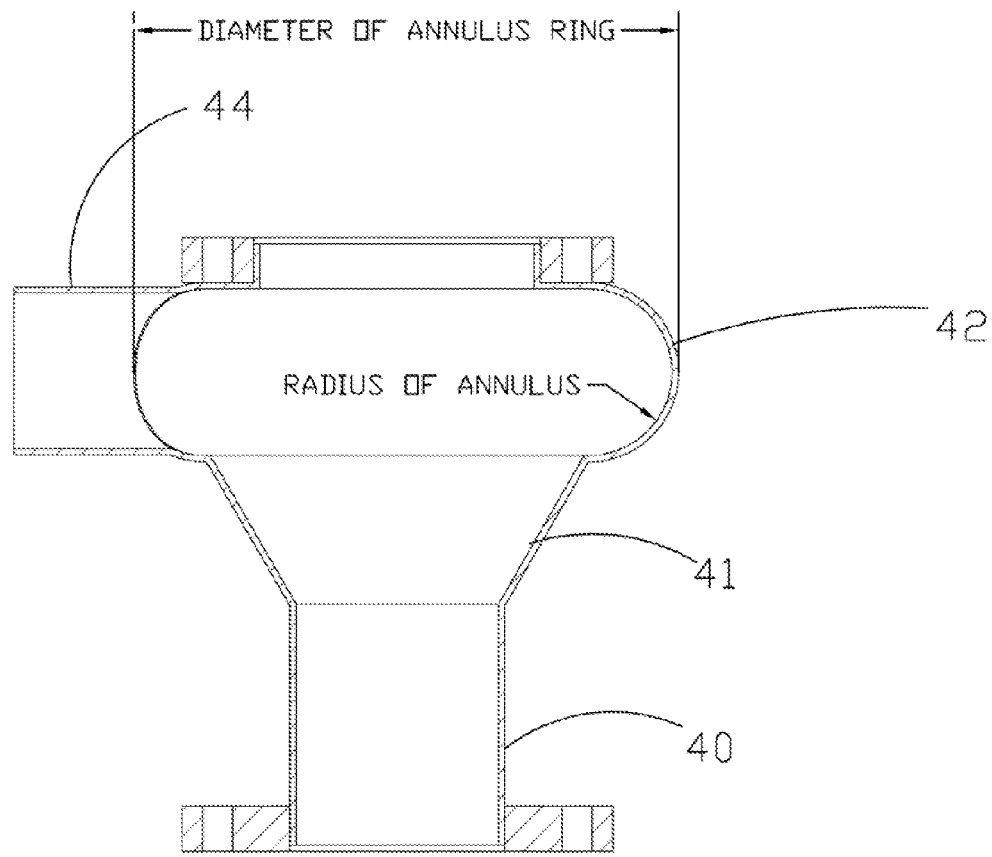
FIG. 6 is a sectional view of the conical chamber of FIG. 5.
Figure 7:
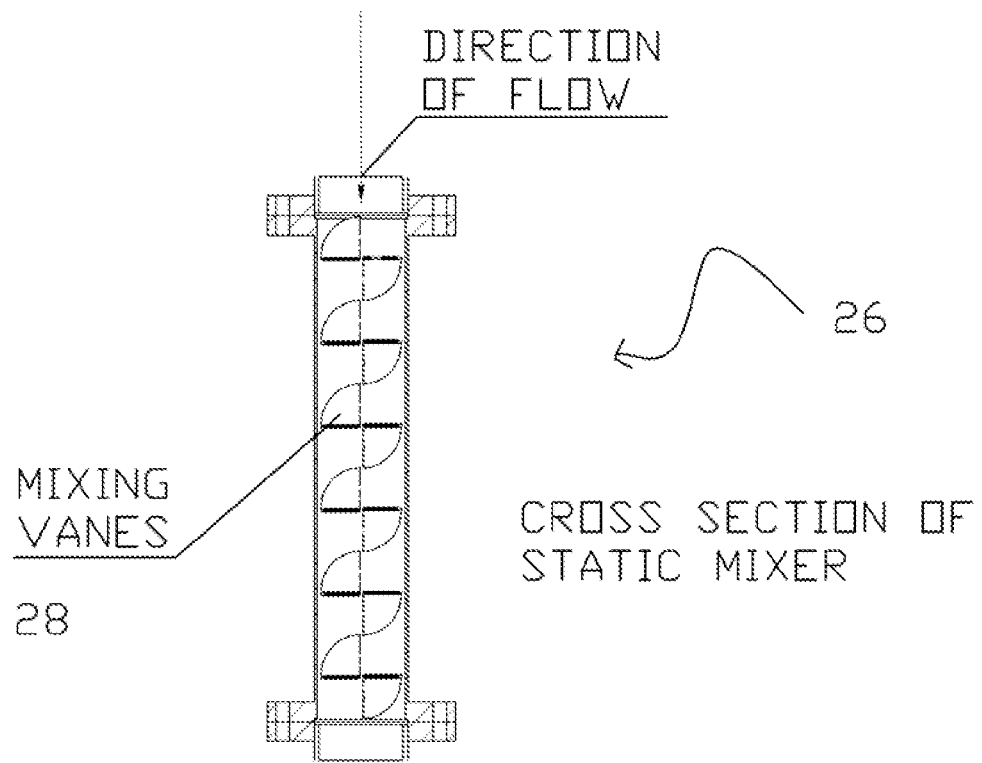
FIG. 7 is a sectional view of one non-limiting static mixer that can be used with the single centrifuge separator of FIG. I or the multiple centrifuge separator of FIG. 3.

FIG. 5 shows the conical chamber meant for collection of solids, which can also be used or is similar to the conical chamber for collection of the higher specific gravity fluid. The angle of the cone is designed such a way to glide the heavier particles into the annulus of the chamber. An intermittent de-sludging cycle can be provided for removing the solids collected in the annulus area.

In one test using centrifuge separator 20, the following results were obtained: Centrifuge Separator was tested for performance for suspended oil in the influent. The oil and grease tested as per EPA 1664A method. Prior to entering centrifuge separator 20; Influent Oil & Grease: 2500 ppm. After running through centrifuge separator 20; Effluent Oil & Grease: <5 ppm.

Some of the benefits, advantages and/or features of the present invention include, but are not limited to, the following:

1) A vertical or substantially vertical centrifuge assembly which can have the following sections:
   a) main inlet pipe with static mixer and as inlet;
   b) inline rotor assembly with casing;
   c) first conical chamber;
   d) straight or substantially straight pipe for flow straightener;
   e) second conical chamber; and
   f) light liquid take off pipe.
2) The Conical Chamber can have the following:
   1) Angle can range from about 30 degrees to about 80 degrees;
   2) The radius of annulus ring in the conical chamber can range from about 1" to about 3";
   3) The location of the second chamber from the first conical chamber can range from about 24" to about 60";
   4) The diameter of the annulus ring can range from about 3" to about 24".

3) The influent can be mixed with oil-wet fines or mixed with surfactant and gas and is processed through the centrifuge separator of the present invention. The injected gas(es) can be one or more of the following, but is not limited thereto, oxygen, ozone, air, CO2, nitrogen, methane, etc. The gas(es) selected for injection into the influent can depend on the process for which the centrifuge separator is being used for.
   a) The addition of gas(es) in the influent can help to provide higher shear action for allowing separation of oil from solids. As centrifugal force is exerted on the fluid and suspended solids by the impeller, solids (which having higher mass) are thrown on outer periphery. The first conical chamber with tapered surface allows the solids to slide into the annulus ring.
   b) Solids that are collected in the annulus ring of the first conical chamber are then discharged through a first discharge port which can be set to open at regular intervals.
   c) The central pipe after first conical chamber can be provided to establish or help establish the definitive zone between the gas-lighter specific gravity liquid and the higher specific gravity liquid under the influence of centrifugal force continuing to be exerted by the impeller as the liquids travel upward within the central pipe.
   d) The second conical chamber facilitates the separation of higher specific gravity liquid and which can be discharged through a second discharge port which can be set to open at regular intervals.
   e) The gas and lighter specific gravity liquid, which continue to spin in the center of the central pipe, are collected through the centrally located take off/collection pipe located at or near the top end the central pipe.
4) The gas injection pressure can be up to about 500 psi and possibly higher.
5) For separation of heavy oil and tank bottom fluids, surfactants and/or solvents can be used at the injection point. The solvent compound can be diesel, Xylene, etc. though such is not considered limiting
6) When processing fruit pulp for separation of juice and pulp, Nitrogen gas is preferred, though not considered limiting, for solid separation at a pressure up to about 500 psi, though such pressure is also not considered to be limiting.
7) When processing sewage sludge and/or suspended sewage particles coagulants such as aluminum, iron chloride can be injected, though such is not considered limiting, to aid in solid separation through first conical chamber.
8) Multiple individual centrifuge separators can be coupled together to form a multiple separator assembly to process influent at a higher flow rate. In this multiple separator configuration, the influent inlet can be common through an inlet manifold; the solid discharge can be common through a solid outlet manifold together, the higher specific gravity liquid outlet can be common through a heavy fluid outlet manifold and/or the lighter specific gravity liquid outlet can he common through a lighter fluid outlet manifold. Each individual centrifuge can be controlled separately or collectively through single or multiple PLC control. Furthermore, the gas inlet can also be common through a manifold.

Thus, with the present invention substances of different specific gravities can be separated by means of induced vortex separation. The present invention provides a system for separating different specific gravity fluids/solids by means of centrifugal action. The inline impeller exerts the centrifugal force on the flowing fluid particles. The present invention centrifugal separator creates different zones of the different specific gravity fluids by entering the centripetal force on the particles. The diameter of rotation of the particle is derived by the rotational speed and the mass of the particle in the fluid, causing the heavier particles to rotate to the outside, as compared to the lighter particles, which permits the various particles to be substantially divides so that the various particles can be collected at designated collection points for the centrifuge separator.

All locations, sizes, shapes, measurements, amounts, angles, voltages, frequencies, component or part locations, configurations, temperatures, weights, dimensions, values, percentages, materials, orientations, etc. discussed above or shown in the drawings are merely by way of example and are not considered limiting and other locations, sizes, shapes, measurements, amounts, angles, voltages, frequencies, component or part locations, configurations, temperatures, weights, dimensions, values, percentages, materials, orientations etc. can be chosen and used and all are considered within the scope of the invention.

The terms pipe and tube are used interchangeably in the above description and claims.

Dimensions of certain parts as shown in the drawings may have been modified and/or exaggerated for the purpose of clarity of illustration and are not considered limiting.

Unless feature(s), part(s), component(s), characteristic(s) or function(s) described in the specification or shown in the drawings for a claim element, claim step or claim term specifically appear in the claim with the claim element, claim step or claim term, then the inventor does not considered such feature(s), part(s), component(s), characteristic(s) or function(s) to be included for the claim element, claim step or claim term in the claim for examination purposes and when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A centrifuge separator, comprising:
   a main inlet pipe having an inlet opening for receiving an Untreated Fluid;
   an inline impeller assembly in fluid communication with the main inlet pipe,
   a first conical chamber positioned above said inline rotor assembly and in fluid communication with said inline impeller assembly, said first conical chamber having a first side outlet, said first conical chamber having a first outer annulus ring and a first ramp portion positioned below the first outer annulus ring, said first ramp portion extending outwards and upwards to expand the Untreated Fluid, said first side outlet in communication with an internal area of said first conical chamber through a first side opening extending through a portion of the first outer annulus ring;

a pipe member in fluid communication with the first chamber, said pipe member disposed above said first chamber;

a second conical chamber positioned at a top end of said pipe member and in fluid communication with said pipe member; said second conical chamber having a second side outlet, said second conical chamber having a second outer annulus ring and a second ramp portion positioned below the second outer annulus ring, said second ramp portion extending outwards and upwards to expand a remaining portion the Untreated Fluid, said second side outlet in communication with an internal area of said second conical chamber through a second side opening extending through a portion of the second outer annulus ring;

a collection pipe at least substantially centrally located with respect to said second conical chamber and said pipe member, said collection pipe in fluid communication with said pipe member;

a gas inlet member in communication with an internal area of the main inlet pipe; and a static mixer disposed with said main inlet pipe for mixing gas received through said gas inlet member with the Untreated Fluid, said gas inlet member in communication with the internal area of said main inlet pipe intermediate of said static mixer and said inlet opening of said main inlet pipe.

2. The centrifuge separator of claim 1 wherein a first inlet end of said collection pipe terminates within said second conical chamber below the second ramp portion.

3. The centrifuge separator of claim 1 wherein said inline impeller assembly comprising:
an internally located impeller in fluid communication with a lower end of said first conical chamber;
a drive shaft operatively associated with said impeller;
a gear box operatively associated with said drive shaft; and
a motor operatively associated with said gear box.

4. The centrifuge separator of claim 1 wherein operation of said inline impeller assembly causes the Untreated Fluid passing by said impeller to spin which in turn causes particles with a higher specific gravity from the Untreated Fluid to spin to an outside where the higher specific gravity particles are diverted by the first ramp portion for collection within the first outer annulus ring of the first conical chamber and radially exited out through said first side outlet.

5. The centrifuge separator of claim 4 wherein after passing through the first conical chamber, a remaining portion of the Untreated Fluid continues to spin through operation of said impeller assembly and travel upwards through said pipe member with higher specific gravity fluids of the remaining portion spinning to an outside position where the higher specific gravity particles of the remaining portion are diverted by the second ramp portion for collection within the first outer annulus ring of the second conical chamber and radially exited out through said second side outlet.

6. The centrifuge separator of claim 5 wherein lower specific gravity fluids of the remaining portion travel within the collection pipe by entering the collection pipe at its first inlet end and are exited out through a second end of the collection pipe.

7. The centrifuge separator of claim 1 a further comprising a supply of gas or gases injected into the internal area of the main inlet pipe through said gas inlet member; wherein the supply of gas or gases is selected from the following gases: oxygen, ozone, air, CO2, nitrogen or methane.

8. The centrifuge separator of claim 1 wherein said first annulus ring having a radius ranging from about 1" to about 3" and said second annulus ring having a radius ranging from about 3" to about 24".

9. The centrifuge separator of claim 1 further comprising a second pipe member having a first end and a second end, said first end of the second pipe member positioned adjacent to and above the inline impeller assembly and the second end of the second pipe member positioned adjacent to and below the first ramp portion of the first conical chamber, wherein the Untreated Fluid is spun by and above the inline impeller assembly prior to separation of solids contained in the Untreated Fluid within the first conical chamber.

10. The centrifuge separator of claim 1 wherein said first ramp portion being disposed at an angle ranging anywhere from about 30 degrees to about 80 degrees.

11. The centrifuge separator of claim 1 wherein said first conical chamber is spaced from said second conical chamber at a distance ranging from about 24" to about 60".

12. The centrifuge separator of claim 1 wherein said first outlet is positioned substantially perpendicular to the first annulus ring and said second outlet is positioned substantially perpendicular to the second annulus ring.

13. A substantially vertically oriented centrifuge separator for separating solids from liquids contained in an Untreated Fluid, comprising:
a main inlet pipe having an inlet opening for receiving an Untreated Fluid;
a gas inlet member in communication with an internal area of the main inlet pipe for injecting gas into the Untreated Fluid;
a static mixer disposed with said main inlet pipe for mixing gas received through said gas inlet member with the Untreated Fluid in order to breakdown gas bubbles from the injected gas into smaller size bubbles, said gas inlet member in communication with the internal area of said main inlet pipe intermediate of said static mixer and said inlet opening of said main inlet pipe;
a single inline impeller assembly in fluid communication with the main inlet pipe;
a first conical chamber positioned above said inline impeller assembly and in fluid communication with said inline impeller assembly, said first conical chamber having a first outer annulus ring defining a first collection area for primarily collecting solids contained in the Untreated Fluid, a first ramp portion positioned below the first outer annulus ring, said first ramp portion extending outwards and upwards to expand the Untreated Fluid, and a first tangential side outlet in communication with the first collection area of said first conical chamber through a first side opening extending through a portion of the first outer annulus ring;
a substantially vertically oriented pipe member in fluid communication with the first conical chamber;
a second conical chamber positioned at a top end of said pipe member and in fluid communication with said pipe member; said second conical chamber having a second outer annulus ring defining a second collection area, a second ramp portion positioned below the second outer annulus ring, said second ramp portion extending outwards and upwards to expand a remaining portion of the Untreated Fluid, and a second tangential side outlet in communication with the second collection area of said second conical chamber through a second side opening extending through a portion of the second outer annulus ring; and a collection pipe at least substantially centrally located with respect to said second conical chamber and said pipe member, said collection pipe in fluid communication with said pipe member;

wherein said single inline impeller assembly spinning the Untreated Fluid entering the first conical chamber and also spinning the remaining portion of the Untreated Fluid that exits out of the first conical chamber through the substantially vertically oriented pipe member.

14. The centrifuge separator of claim 13 wherein a first inlet end of said collection pipe terminates within said second conical chamber below the second ramp portion.

15. The centrifuge separator of claim 13 wherein said inline impeller assembly comprising:

an internally located impeller in fluid communication with a lower end of said first conical chamber;

a drive shaft operatively associated with said impeller;

a gear box operatively associated with said drive shaft; and a motor operatively associated with said gear box.

16. The centrifuge separator of claim 13 wherein operation of said inline impeller assembly causes the Untreated Fluid passing by said impeller to spin which in turn causes particles with a higher specific gravity from the Untreated Fluid to spin to an outside position where the higher specific gravity particles are diverted by the first ramp portion for collection within the first collection area defined by the first annulus ring of the first conical chamber and radially exited out through said first side outlet; wherein after passing through the first chamber, a remaining portion of the Untreated Fluid continues to spin through operation of said impeller and travel upwards through said pipe member with higher specific gravity fluids of the remaining portion spinning to an outside position where the higher specific gravity particles of the remaining portion are diverted by the second ramp portion for collection within the second collection area defined by the second annulus ring of the second conical chamber and radially exited out through said second side outlet; wherein lower specific gravity fluids of the remaining portion travel within the collection pipe by entering the collection pipe at its first inlet end and are exited out through a second end of the collection pipe.

17. The centrifuge separator of claim 13 further comprising a supply of gas or gases injected into the internal area of the main inlet pipe through said gas inlet member; wherein the supply of gas or gases is selected from the following gases: oxygen, ozone, air, $CO_2$, nitrogen or methane.

18. The centrifuge separator of claim 13 wherein said first ramp portion being disposed at angle ranging anywhere from about 30 degrees to about 80 degrees.

* * * * *